United States Patent [19]

Sasaki et al.

[11] Patent Number: 5,805,888
[45] Date of Patent: Sep. 8, 1998

[54] IDENTIFIER DICTIONARY-GENERATING DEVICE

[75] Inventors: Koji Sasaki; Yasushi Kawai, both of Kawasaki, Japan

[73] Assignee: Fujitsu Limited, Kawasaki, Japan

[21] Appl. No.: 279,871

[22] Filed: Jul. 29, 1994

[30] Foreign Application Priority Data

Nov. 25, 1993 [JP] Japan .................................. 5-295211

[51] Int. Cl.[6] .............................. G06F 17/00; G06F 17/22
[52] U.S. Cl. ........................... 395/703; 395/760; 395/758
[58] Field of Search ......................... 364/419.08, 419.11, 364/419.01; 395/700, 750, 758, 759, 701, 703, 705

[56] References Cited

U.S. PATENT DOCUMENTS

| | | | |
|---|---|---|---|
| 4,481,577 | 11/1984 | Forson | 395/600 |
| 4,579,533 | 4/1986 | Anderson et al. | 434/157 |
| 4,742,467 | 5/1988 | Messerich et al. | 395/703 |
| 4,989,145 | 1/1991 | Kyushima | 364/419.08 |
| 5,187,788 | 2/1993 | Marmelstein | 395/703 |
| 5,259,766 | 11/1993 | Sack et al. | 434/362 |
| 5,375,237 | 12/1994 | Tanaka et al. | 395/650 |
| 5,432,930 | 7/1995 | Song | 395/600 |
| 5,452,206 | 9/1995 | Turrietta et al. | 364/419.17 |
| 5,640,576 | 6/1997 | Kobayashi et al. | 395/759 |

FOREIGN PATENT DOCUMENTS

A-2-66631  6/1990  Japan .
4-344523  12/1992  Japan .

*Primary Examiner*—Gail O. Hayes
*Assistant Examiner*—Joseph Thomas
*Attorney, Agent, or Firm*—Staas & Halsey

[57] ABSTRACT

There is provided an identifier dictionary-generating device for use in a system for reversely producing specifications expressed in a vernacular language from a high-level language program. The identifier dictionary-generating device extracts alphabetic identifiers of variable names and corresponding vernacular identifiers, to form an dictionary of identifiers. The identifier dictionary-generating device is comprised of a word fetching device for fetching words from the high-level language program, a first identifier extracting device for extracting a first identifier from words fetched by the word fetching device and a second identifier extracting device for extracting a second identifier in a vernacular language from the words fetched by the word fetching device, and a registering device for registering the first identifier and the second identifier into the dictionary when the first identifier and the second identifier corresponding thereto are extracted. The dictionary containing variable names dentifiers in alphabetic characters and vernacular identifiers provided in a manner correspondent thereto can be prepared by setting the first identifier to an alphabetic identifier as a variable name, and the second identifier to an identifier obtained from a comment in a vernacular language annotated on the variable name.

7 Claims, 7 Drawing Sheets

```
┌── C-LANGUAGE PROGRAM (ALPHABETIC) ──────┐
│   char    InBuff[100];      /* INPUT AREA */      │─ 20
│   char    OutBuff[100];     /* OUTPUT AREA */     │
│   int     cnt;              /* COUNTER */         │
│   int     tot ;             /* TOTAL */           │
│                  ⋮                                 │
│                  ⋮                                 │
│   tot  =0;                                         │
│   for(cnt=0;cnt<100;cnt++)   {                     │
│     tot  +=InBuff[cnt];                            │
│   }                                                │
│                  ⋮                                 │
│                  ⋮                                 │
└────────────────────────────────────────────┘
```

FIG.3

30 IDENTIFIER DICTIONARY

| ALPHABETIC | VERNACULAR |
|---|---|
| InBuff | INPUT AREA |
| OutBuff | OUTPUT AREA |
| cnt | COUNTER |
| tot | TOTAL |

FIG. 4

```
─── C-LANGUAGE PROGRAM (VERNACULAR) ───
char  INPUT AREA[100] ;  /* INPUT AREA */
char  OUTPUT AREA[100]; /* OUTPUT AREA */
int   COUNTER ;          /* COUNTER */
int   TOTAL ;            /* TOTAL */
        ⋮
        ⋮
TOTAL=0;
for(COUNTER=0; COUNTER<100: COUNTER++) {
TOTAL+=INPUT AREA[COUNTER];
}
        ⋮
        ⋮
```
50

FIG.5

IDENTIFIER DICTIONARY-GENERATING DEVICE

BACKGROUND OF THE INVENTION

(1) Field of the Invention

This invention relates to an identifier dictionary-generating device, and more particularly to an identifier dictionary-generating device used in a system for reversely producing specifications and the like expressed in a vernacular language, from a high-level language program.

(2) Description of the Related Art

Conventionally, in the field of reengineering and reverse engineering, specifications and other documents expressed in a vernacular language are reversely produced from assets of programs described in high-level computer languages, such as C, FORTRAN and COBOL, or are used.

There are systems which are capable of producing specifications in which control structures of programs are expressed in a form suitable for visual comprehension. one of them is the method of YACII (Yet Another Control Chart II). This method, which is based on the concept of structured programming as a basic principle of designing a program in an easily comprehensible manner, makes it possible to express a flow of programmed control as a chart having a tree structure to thereby clearly express the logical structure of the program. In a high-level language program, with respect to alphabetic identifiers used in conditional expressions and control statements, vernacular identifiers correspondent thereto are known, and hence specifications can be produced in which these alphabetic identifiers are converted into the correspondent vernacular identifiers.

In improving or reforming a program made by another programmer, in the first place, vernacular specifications described in the form of YACII are produced from the source program to analyze the control structure of the program. However, particularly as to variables used in the source program, they are expressed in alphabetic abbreviations or words coined by the programmer, and hence it is impossible to express these variables in a vernacular language in reversely producing the specifications from the program. Therefore, a dictionary is desired in which alphabetic variable names are provided in a manner correspondent to identifiers expressed in a vernacular language (i.e. vernacular identifiers). Although it is possible to automatically recognize and extract alphabetic variables from a high-level language program, conventionally, vernacular identifiers correspondent thereto are entered, item by item, by means of an editor, for example, after reading the extracted alphabetic names and devising suitable vernacular identifiers on the analogy of the alphabetic variable names. Therefore, if a large number of variables are used, there arises a problem that a work for merely inputting the vernacular identifiers correspondent to the alphabetic variables requires a considerable time period and labor.

SUMMARY OF THE INVENTION

It is the object of the invention to provide an identifier dictionary-generating device which is capable of generating an identifier dictionary by extracting alphabetic identifiers of variable names and vernacular identifiers correspondent thereto from a high-level language program.

To attain the above object, the present invention provides an identifier dictionary-generating device for extracting a first identifier and a second identifier correspondent thereto from a high-level language program, to generate a dictionary of identifiers. The identifier dictionary-generating device comprises word fetching unit for reading a source program described in a high-level language to sequentially fetch words described therein, first identifier extracting means for extracting a first identifier from words fetched by the word fetching unit, second identifier extracting unit for extracting a second identifier from the words fetched by the word fetching unit, and registering unit for registering the first identifier and the second identifier into a dictionary when the second identifier extracted by the second identifier extracting unit corresponds to the first identifier extracted by the first identifier extracting unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an example of a C-language program expressed in alphabetic characters;

FIG. 4 is a diagram showing an example of an identifier dictionary;

FIG. 5 is a diagram showing an example of a C-language program in which alphabetic identifiers are converted into vernacular ones;

DESCRIPTION OF THE PREFERRED EMBODIMENTS

Figure 1:
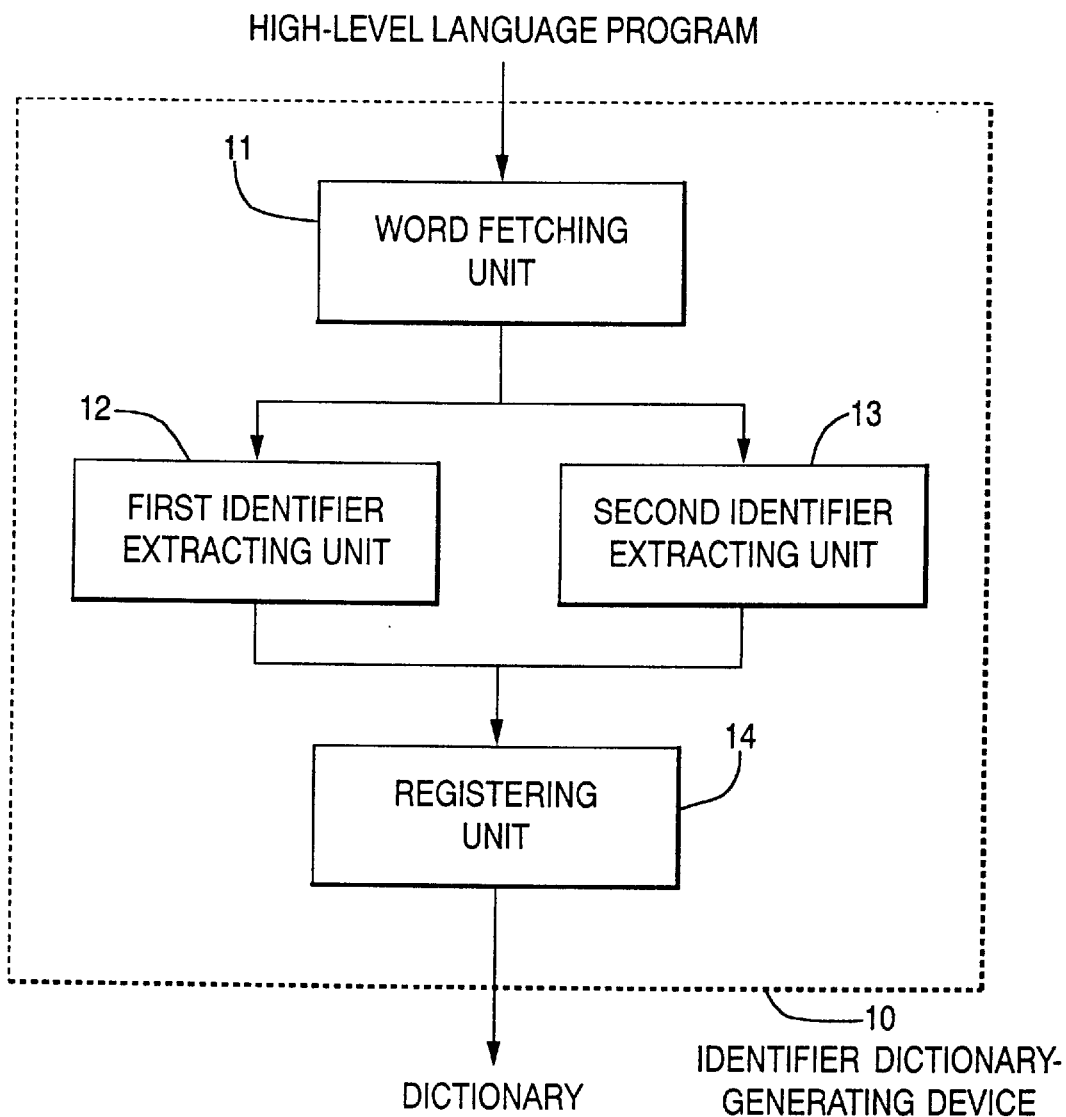
FIG. 1 is a block diagram illustrating the principle of an identifier dictionary-generating device according to the invention.

FIG. 1 shows a diagrammatic representation of the principle of an identifier dictionary-generating device according to the invention. In this figure, the identifier dictionary-generating device 10 includes word fetching unit 11 for reading a source program described in a high-level language to sequentially fetch words entered therein. The word fetching unit 11 is connected to first identifier extracting unit 12 for extracting a first identifier from the words fetched by the word fetching unit 11, and second identifier extracting unit 13 for extracting a second identifier from the same. Further, the identifier dictionary-generating device 10 also includes registering unit 14 for registering, when a first identifier and a second identifier corresponding thereto are extracted by the first identifier extracting unit 12 and the second identifier extracting unit 13, respectively, the first identifier and the second identifier into a dictionary.

According to the identifier dictionary-generating device of the present invention, the word fetching unit 11 sequentially fetches words from a high-level language program, the first identifier extracting unit 12 extracts a first identifier, which is a variable name expressed in alphabetic characters, from the words, and the second identifier extracting means 13 extracts a second identifier, which is expressed in a vernacular language, from the words. The second identifier is extracted from comments or comment statements annotated on respective first identifiers in the high-level language. Finally, when the first identifier extracted by the first identifier extracting unit 12 corresponds to the second identifier extracted by the second identifier extracting unit 13, the registering unit 14 registers the first identifier and the second identifier into the dictionary.

Next, there will be described a specification producing system incorporating the identifier dictionary-generating device according to the invention.

Figure 2:
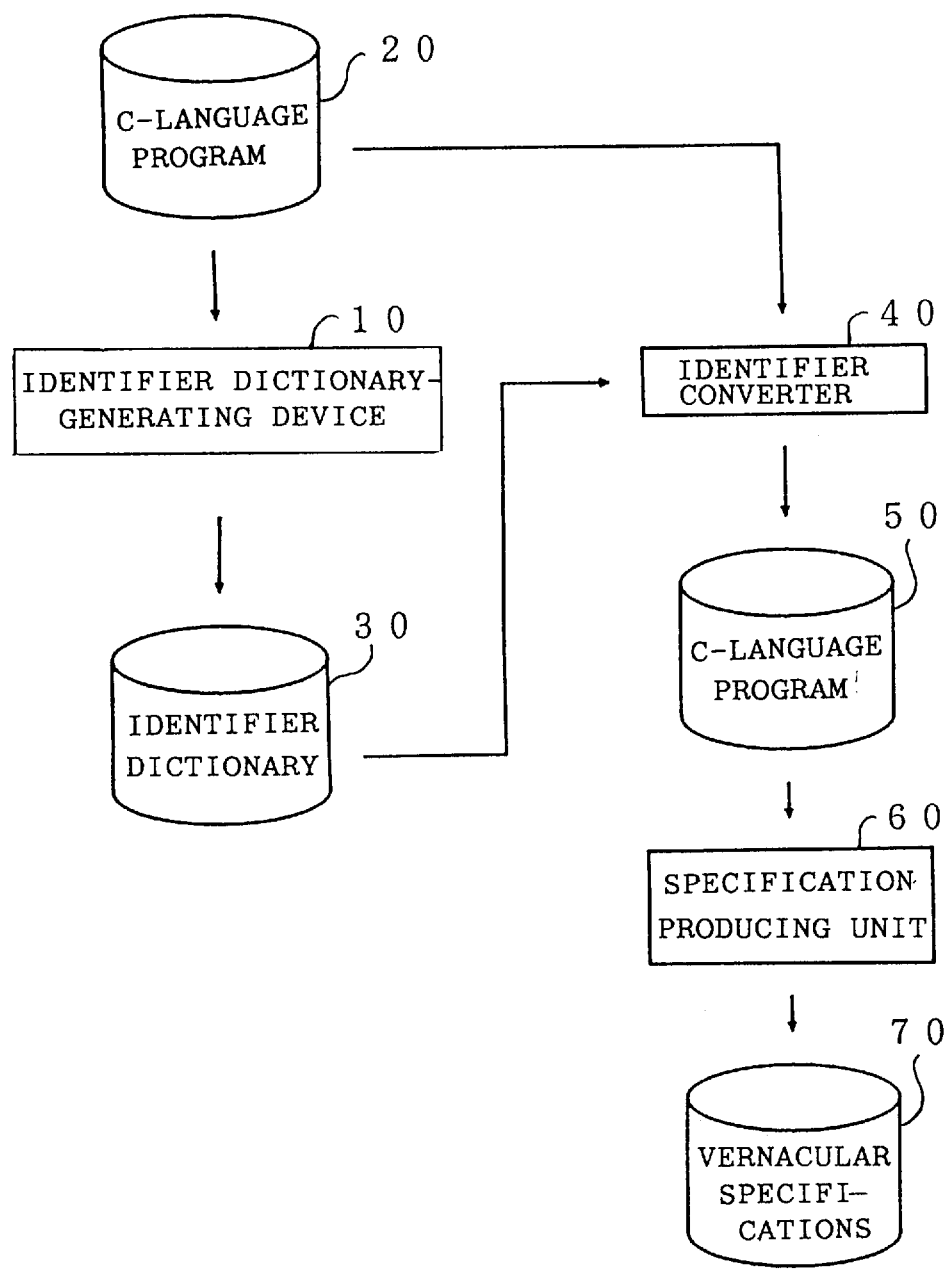
FIG. 2 is a block diagram showing the arrangement of a system for producing specifications expressed in a vernacular language from a high-level language program.

FIG. 2 shows the arrangement of the specification producing system for producing specifications expressed in a vernacular language from a high-level language program. In an illustrated example, the C language is used as the high-level programming language.

The specification producing system shown in FIG. 2 is comprised of a C-language program 20 described in alphabetic characters, an identifier dictionary-generating device 10 to which the C-language program 20 is input, an identifier dictionary 30 generated by the identifier dictionary-generating device 10, an identifier converter 40 to which an output from the C-language program 20 and an output from the identifier dictionary 30 are input, a C-language program 50 in a vernacular language delivered from the identifier converter 40, a specification producing unit 60 to which this C-language program 50 is input, and a specification 70 in the vernacular language delivered from the specification producing unit 60.

The identifier converter 40 is supplied with the C-language program 20 described in alphabetic characters, and converts alphabetic characters as variable names into corresponding vernacular identifiers with reference to the identifier dictionary 30 generated by the identifier dictionary-generating device 10 to produce the C-language program 50 expressed in the vernacular language. The specification producing unit 60 produces the vernacular specification 70 described e.g. in the form of YACII from the vernacular C-language program 50.

FIG. 3 shows an example of the C-language program expressed in alphabetic characters. According to the C-language program 20, variables are declared at an opening portion of the program, which portion is the object of processing by the identifier dictionary-generating device 10 according to the invention. In this example shown in FIG. 3, a variable-declaring sentence on a first line is formed by "char", which means that a declared variable is a character type, "InBuff", which defines a variable name representing a variable, "[100]", which shows the size of a character array, and "/* input area */", which is a comment annotated on the variable name described in alphabetic characters, and also serves as a vernacular identifier corresponding thereto.

Thus, a program generally includes vernacular comments for describing roles of declared variables. The identifier dictionary-generating device 10 of the invention pays attention to such descriptions provided in the program, and extracts variable names and vernacular comments thereon, thereby producing the identifier dictionary 30 of alphabetic identifiers and vernacular identifiers correspondent thereto.

FIG. 4 shows an example of the identifier dictionary. As shown therein, in the identifier dictionary 30, alphabetic identifiers as variables and vernacular identifiers correspondent thereto, which are extracted by the identifier dictionary-generating device 10, are registered in the form of a conversion table covering the whole number of variables. It should be noted that the vernacular identifiers are registered therein by copying comments annotated on the respective variables in the C-language program 20, and may be edited, if required.

FIG. 5 shows an example of the C-language program in which the alphabetic identifiers have been converted into the vernacular language. It is understood from this figure that in this C-language program 50, all variable names provided in the C-language program 20 expressed in alphabetic characters are converted into vernacular name correspondent thereto which have been registered in the identifier dictionary 30.

Figure 6:
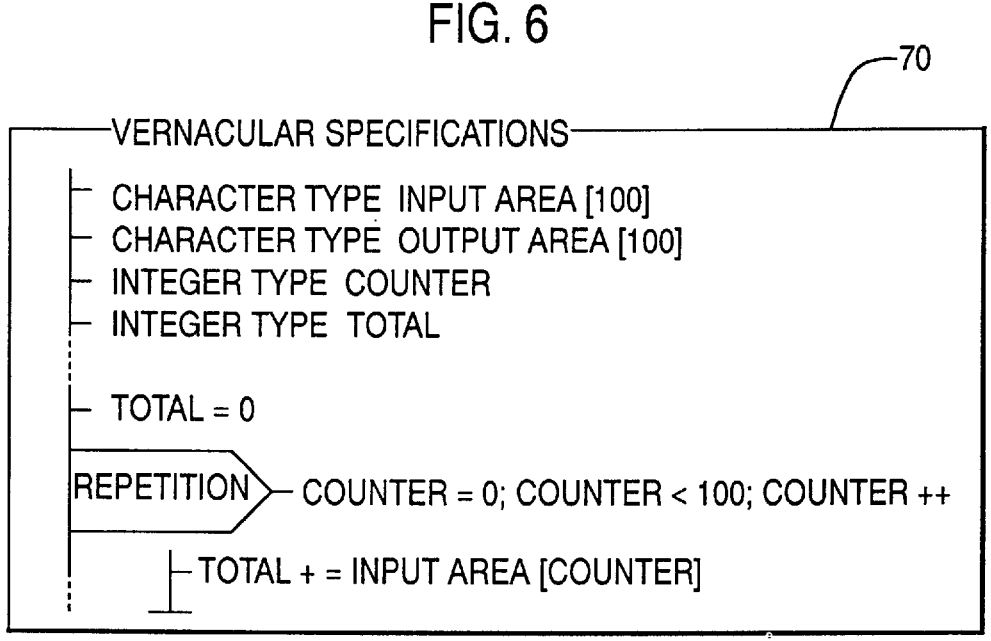
FIG. 6 is a diagram showing an example of vernacular specifications produced by a specification producing uint.

FIG. 6 shows an example of the specification in the vernacular language produced by the specification producing unit 60. It is understood from this figure that the C-language program 50 expressed in the vernacular language is reformed into the specification 70 in the vernacular language in the form of YACII, which is capable of expressing the control structure of the program.

Figure 7:
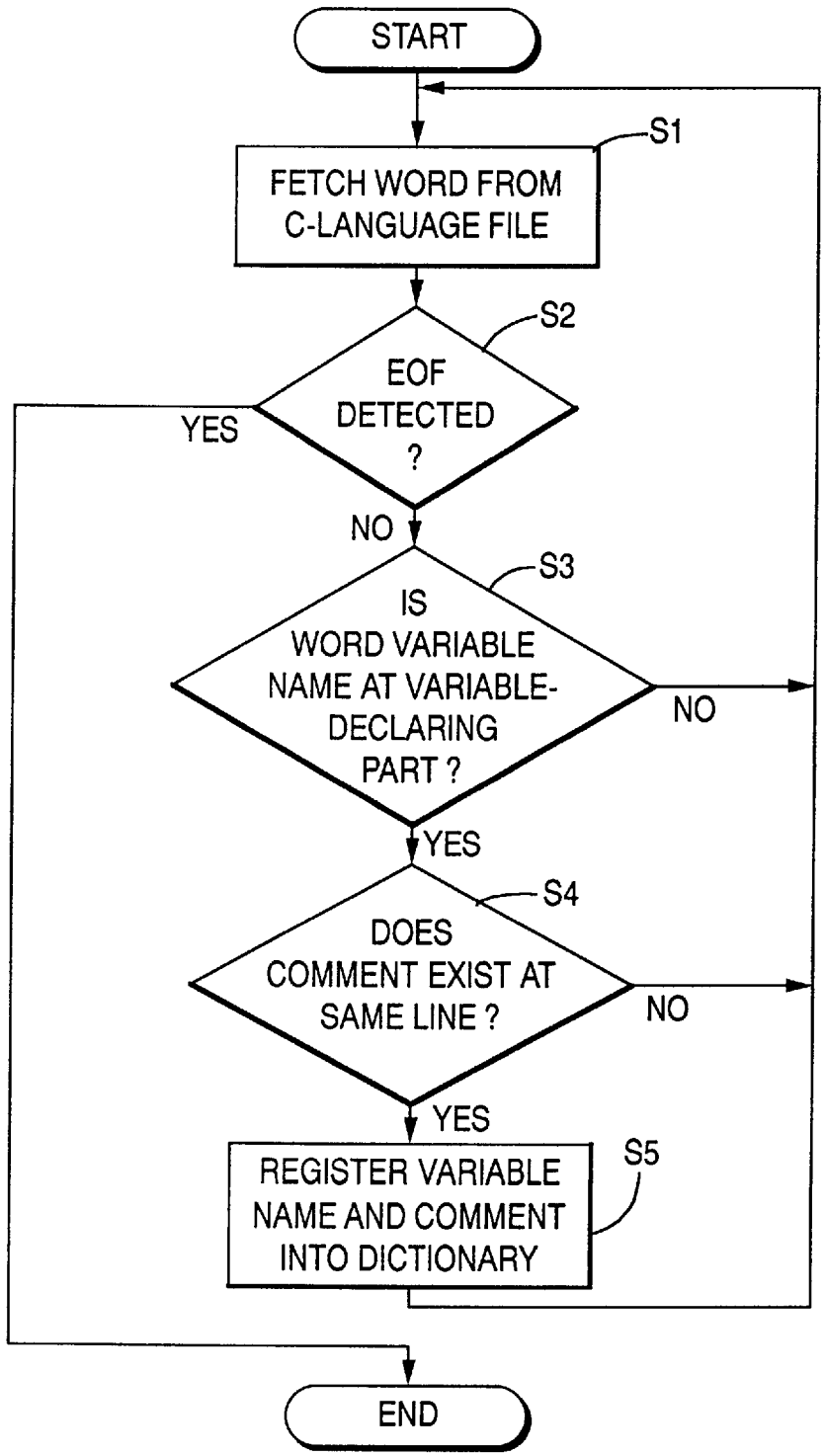
FIG. 7 is a flowchart of a program for processing executed by the identifier dictionary-generating device.

FIG. 7 shows an example of a program for processing performed by the identifier dictionary generating-device. According to this program, the identifier dictionary-generating device 10 generates, from declared variables and comments annotated thereon in the C-language program 20, the identifier dictionary 30 in which alphabetic identifiers and vernacular identifiers are provided in a manner corresponding to each other.

First, the identifier dictionary-generating device 10 sequentially fetches words from a file storing the C-language program at a step S1. Whenever one word is fetched, it is determined at a step S2 whether or not processing has reached the end of the file, i.e. whether or not a label EOF (End Of File) described at the end of the file is detected. If the label EOF is detected, the present processing is terminated.

If the answer to the question of the step S2 is negative (NO), it is determined at a step S3 whether or not the word fetched is a variable name declared at a variable-declaring part of the program. If the answer to this question is negative (NO), the program returns to the step S1 to fetch the following word, whereas if the answer is affirmative (YES), the program proceeds to a step S4 where it is determined whether or not there is a comment at the same line at which the word exists, which begins with "/*". If the answer to this question is negative (NO), the program returns to the step S1 to fetch the following word, whereas if the answer is affirmative (YES), the program proceeds to a step S5, where the variable name detected at the step S3 and the comment thereon detected at the step S4 are registered into the identifier dictionary 30. When this registration is completed, the program returns to the step S1 to resume fetching of the following words.

Further, although, in the above embodiment, variable names in alphabetic characters described in a high-level language program and comments thereon in a vernacular language are entered in the dictionary in a corresponding manner, it is also possible to enter variable names expressed in abbreviations or coined words in alphabetic characters, and corresponding fully-described or formal names expressed in alphabetic characters.

As described hereto fore, the identifier dictionary-generating device of the present invention can be constructed such that identifiers in a vernacular language, which are respectively correspondent to alphabetic variable identifiers in a high-level language program, can be extracted from comments in the high-level language program annotated on the alphabetic variable names. Therefore, in reversely preparing a specification in the vernacular language from the high-level language program, it is possible to substantially reduce a time period required in producing a dictionary of variable names described in alphabetic characters and corresponding names in the vernacular language. Further, since vernacular identifiers correspondent to alphabetic identifiers of variables are thus provided in a certain form in advance, it is easier to edit the dictionary thus prepared, if required, than to first devise the vernacular identifiers and then enter data thereof into the dictionary.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An identifier dictionary-generating device extracting identifiers from a high-level computer language program and generating a dictionary of identifiers used in a computer system, said identifier dictionary-generating device comprising:

word fetching means for reading from a file a source program described in the high-level language program and for sequentially fetching words described therein;

first identifier extracting means for extracting a first identifier from said words fetched by said word fetching means, said first identifier being a symbolic variable name expressed in alphabetic characters in said source program;

second identifier extracting means for extracting a second identifier from said words fetched by said word fetching means, said second identifier being a vernacular language expression expressing said first identifier; and registering means for registering said first identifier and said second identifier into the dictionary of identifiers when said second identifier extracted by said second identifier extracting means corresponds to said first identifier extracted by said first identifier extracting means.

2. An identifier dictionary-generating device according to claim 1, wherein:

said first identifier comprises an abbreviated variable name expressed in alphabetic characters in said source program, and said second identifier comprises an expression clarifying in detail said first identifier with alphabetic characters.

3. An identifier dictionary-generating device according to claim 1, wherein:

said first identifier extracting means extracts said first identifier from a variable-declaring sentence in said source program, and said second identifier extracting means extracts said second identifier from a comment included in said variable-declaring sentence.

4. A specification producing system producing specifications expressed in a vernacular language from a high-level computer language program, said specification producing system comprising:

a computer storing a source program of the high-level computer language program in a file and comprising:
an identifier dictionary-generating device reading from the file the source program, sequentially fetching words described therein, and extracting a symbolic variable name expressed in alphabetic characters in said source program and a vernacular language expression expressing said symbolic variable name;

an identifier dictionary, coupled to and generated by said identifier dictionary-generating device, and storing said symbolic variable name and said vernacular language expression registered into the dictionary of identifiers by the identifier dictionary-generating device if said vernacular language expression corresponds to said symbolic variable name;

an identifier converter, coupled to the file storing the source program and to the identifier dictionary, and receiving input from the file and the identifier dictionary, and outputting a vernacular language program based on the input; and a specification producing unit, coupled to the identifier converter, receiving the vernacular language program, and outputting a specification in the vernacular language based on the vernacular language program.

5. The specification producing system as claimed in claim 4, wherein said identifier dictionary-generating device further comprises:

word fetching means for reading from the file the source program described in the high-level language program and for sequentially fetching words described therein;

first identifier extracting means for extracting a first identifier from said words fetched by said word fetching means, said first identifier being the symbolic variable name expressed in alphabetic characters in said source program;

second identifier extracting means for extracting a second identifier from said words fetched by said word fetching means, said second identifier being the vernacular language expression expressing said first identifier; and registering means for registering said first identifier and said second identifier into the dictionary of identifiers when said second identifier extracted by said second identifier extracting means corresponds to said first identifier extracted by said first identifier extracting means.

6. An identifier dictionary-generating device according to claim 5, wherein:

said first identifier comprises an abbreviated variable name expressed in alphabetic characters in said source program, and said second identifier comprises an expression clarifying in detail said first identifier with alphabetic characters.

7. An identifier dictionary-generating device according to claim 5, wherein:

said first identifier extracting means extracts said first identifier from a variable-declaring sentence in said source program, and said second identifier extracting means extracts said second identifier from a comment included in said variable-declaring sentence.

* * * * *

UNITED STATES PATENT AND TRADEMARK OFFICE
CERTIFICATE OF CORRECTION

PATENT NO. : 5,805,888

DATED : September 8, 1998

INVENTOR(S) : Sasaki et al.

It is certified that error appears in the above-indentified patent and that said Letters Patent is hereby corrected as shown below:

Col. 5, Claim 3, line 53, START A NEW PARAGRAPH with "said second".

Signed and Sealed this

Ninth Day of March, 1999

Attest:

*Attesting Officer*

Q. TODD DICKINSON

*Acting Commissioner of Patents and Trademarks*